United States Patent [19]

Van Daal

[11] 4,375,102

[45] Feb. 22, 1983

[54] DIGITAL CODE WORD DETECTION

[75] Inventor: Andreas J. W. Van Daal, Hilversum, Netherlands

[73] Assignee: U.S. Philips Corporation, New York, N.Y.

[21] Appl. No.: 173,309

[22] Filed: Jul. 29, 1980

[30] Foreign Application Priority Data

Aug. 3, 1979 [NL] Netherlands ......................... 7905968

[51] Int. Cl.³ .............................................. H04L 7/02
[52] U.S. Cl. ...................................... 375/94; 375/106; 371/42; 329/104; 340/146.3 WD
[58] Field of Search ................. 375/106, 108, 94, 114, 375/116; 370/106, 108; 371/5, 37, 42, 47, 39, 40; 340/146.3 WD; 329/104

[56] References Cited

U.S. PATENT DOCUMENTS 3,463,911 8/1969 Dupraz et al. ......................... 371/47
4,271,520 6/1981 Coombes et al. .................... 375/114

Primary Examiner—Benedict V. Safourek
Assistant Examiner—Stephen Chin
Attorney, Agent, or Firm—James J. Cannon, Jr.

[57] ABSTRACT

A method by which code words in a digital bit stream can be detected in a reliable manner without word synchronization, in an environment where the bit error rate is high. The bit stream is divided into data blocks having a number of bits equal to the number of bits of the code word. The number of times that the same bit state is detected in a plurality of blocks in the same relative position in the data block is accumulated. For each bit position the accumulated value is compared with a threshold value and when the threshold value for each bit position is exceeded, the code word is detected from the digital state of the accumulated value. The cyclic permutation of the bits of the code word and the code word itself represent one and the same message. In a device using this method, a bit counter feeds a word counter with the bit stream applied at an output, a shift register receiving each data block as effectively formed by the word counter. Counters count the "1" and "0" occurrences in each shift register section in successive data blocks. Threshold devices provide outputs when their thresholds as given by generators and are exceeded. The outputs are gated by combinatorial logic gates, to record a detected code word in a register 33 which addresses a store 33 to find the associated message.

9 Claims, 6 Drawing Figures

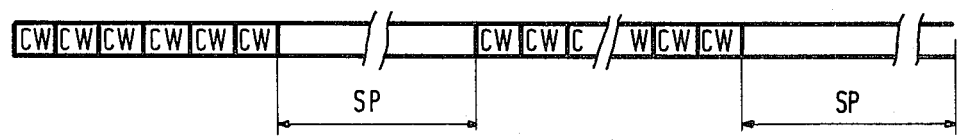
FIG.1
```
a    0 1 0 0 1 1 0 0
b    0 0 1 0 0 1 1 0
c    0 0 0 1 0 0 1 1
d    1 0 0 0 1 0 0 1
e    1 1 0 0 0 1 0 0
f    0 1 1 0 0 0 1 0
g    0 0 1 1 0 0 0 1
h    1 0 0 1 1 0 0 0
     |1|2|3|4|5|6|7|8|
```
FIG.2
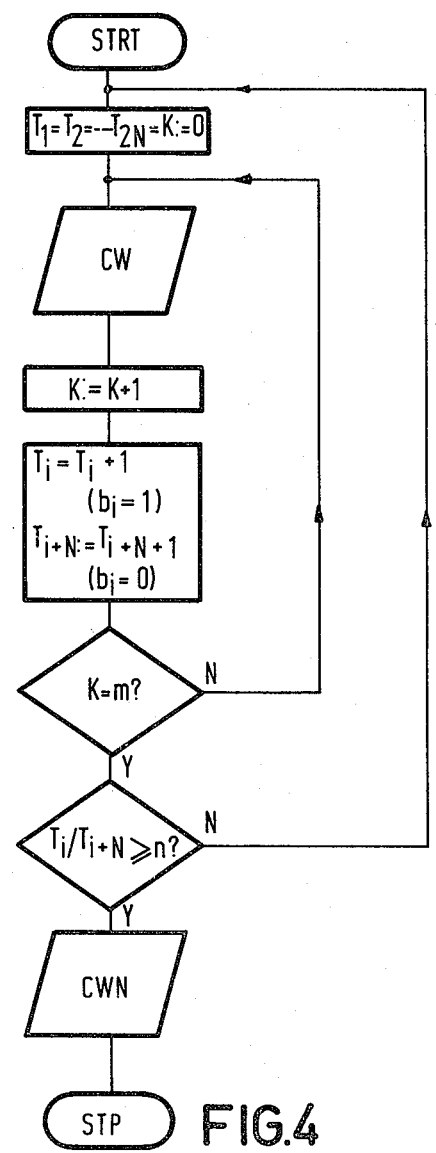
FIG.4

DIGITAL CODE WORD DETECTION

BACKGROUND OF THE INVENTION

The invention relates to a method suitable for detecting a message in the form of a digital code word, the code word containing a sequence of a predetermined number of bits and being included a few times consecutively and sequentially in a bit stream. The invention also relates to means for performing the method.

DESCRIPTION OF THE PRIOR ART

A method of the above type is known from French Patent Specification No. 2309101. This method is used to detect digital code word which are transmitted for signaling purposes in a PCM telephone system. The code words consist of two groups of bits: a first group (the bits 1 to 4) which is the same for all code words, the so-called prefix, and a second group (the bits 5 to 10) which is different for all code words. By means of the prefix it is determined where the distinguishing portion of the code word starts.

In telephone systems in which signaling is in accordance with the compelled release procedure a forward signal is not ended until after the reception of a backward signal, which is ended after the appearance of the forward signal has been detected. This considerably increases the chance that a code word which is repeatedly received is exactly the same as the desired code word.

Delta-modulation is used as the speech coding method in some digital telephone systems, the reason being that, at a relatively low bit rate (16 to 32 kbits/s) a better performance is obtained than with the PCM and that the speech encoded in accordance with this method has a greater resistance against the effect of a high bit error rate. A further reason is that a single channel does not require word synchronization. The compelled signaling in these systems is also effected in the form of code words. Typical requirements imposed on the detection of the code word in such a high bit error rate system are, for signaling in the setting-up phase: if a bit stream is presented with 0% bit error rate (BER), then a code word must be detected after the reception of not more than 10 (identical) code words. if a bit stream is presented with 10% BER, then the code word must be detected with a probability of 99.99% that it is the correct code word, after the reception of not more than 64 code words.

For signaling in the traffic phase the requirements are more stringent, as the signaling information is transmitted among speech or data information. The problem then occurs that that information could imitate a code word. It is a requirement that a random bit pattern at the input of a detector must not cause spurious detector response more than once in $7.7 \times 10^{10}$ bits. Additional requirements in the traffic phase are that the code word must have been detected with a probability of 99.99% that it is the correct code word after not more than 40 code words for 0% BER and after not more than 256 code words for 10% BER.

SUMMARY OF THE INVENTION

It is an object of the invention to provide a method with which code words occurring in a bit stream with a high bit error rate are reliably detected in a simple manner, without word synchronization. To that end, according to the invention, a method of the type referred to is characterized in that the bit stream is randomly divided into data blocks, each block having a number of bits which is equal to the the number of bits of the code word;

the digital bit state is determined and recorded for each bit position in the data block;

the recorded data of each bit position are accumulated for a plurality of consecutive data blocks;

the accumulated value of each bit position in the data block is compared with a threshold valve; and the code word is detected from the digital state of the accumulated values when the threshold value for each bit position in the data block has been reached.

In principle $2^N$ messages can be coded with N-bit code words. Group of code words which are detectable without word synchronization are obtained by allotting the same message to a code word and to all the code words derived from this code word by cyclic permutation of the bits. With $N=8$, that is to say with 36 messages from 256 words, the majority of which may occur in 8 configurations, it is possible to satisfy amply the need for signaling and switching characters for the majority of telephone systems.

A further advantage of the method according to the invention is that it can be realized in a simple manner in universal sequentially programmable logic circuits, such as commercially available microprocessors, with associated stores and peripheral equipment.

Is a further object of the invention to provide a code detector for carrying out the method in accordance with the invention, which code detector comprises, a shift register having a number of sections equal to the number of bits (N) of the code word, each section of the shift register having an output; means for randomly dividing the bit stream into data blocks of N bits, these data blocks being applied to an input of the shift register; the output of each section being coupled to associated counting means for determining the number of times that the same digital state of the bit has occurred in each section in a plurality of data blocks; and the detector further comprising threshold devices each having a first input for receiving a threshold value and a second input connected to the associated counting means, and an output, the outputs of the threshold devices providing signal values, which are a representation of the code word when the threshold value of each threshold device is exceeded.

BRIEF DESCRIPTION OF THE DRAWINGS

Embodiments of the invention and its advantages will be further explained with reference to the accompanying drawings, in which the same reference numerals are used in different Figures for corresponding elements. In the drawings:

FIG. 1, consisting of a–h, is an illustration of a series of sequential, consecutive identical code words in a bit stream;

FIG. 2 shows a code word and the cyclic permutations of that code word for use in accordance with the invention;

FIG. 4 is a flow chart of a first embodiment of the method according to the invention;

DESCRIPTION OF THE PREFERRED EMBODIMENTS

Figure 3:
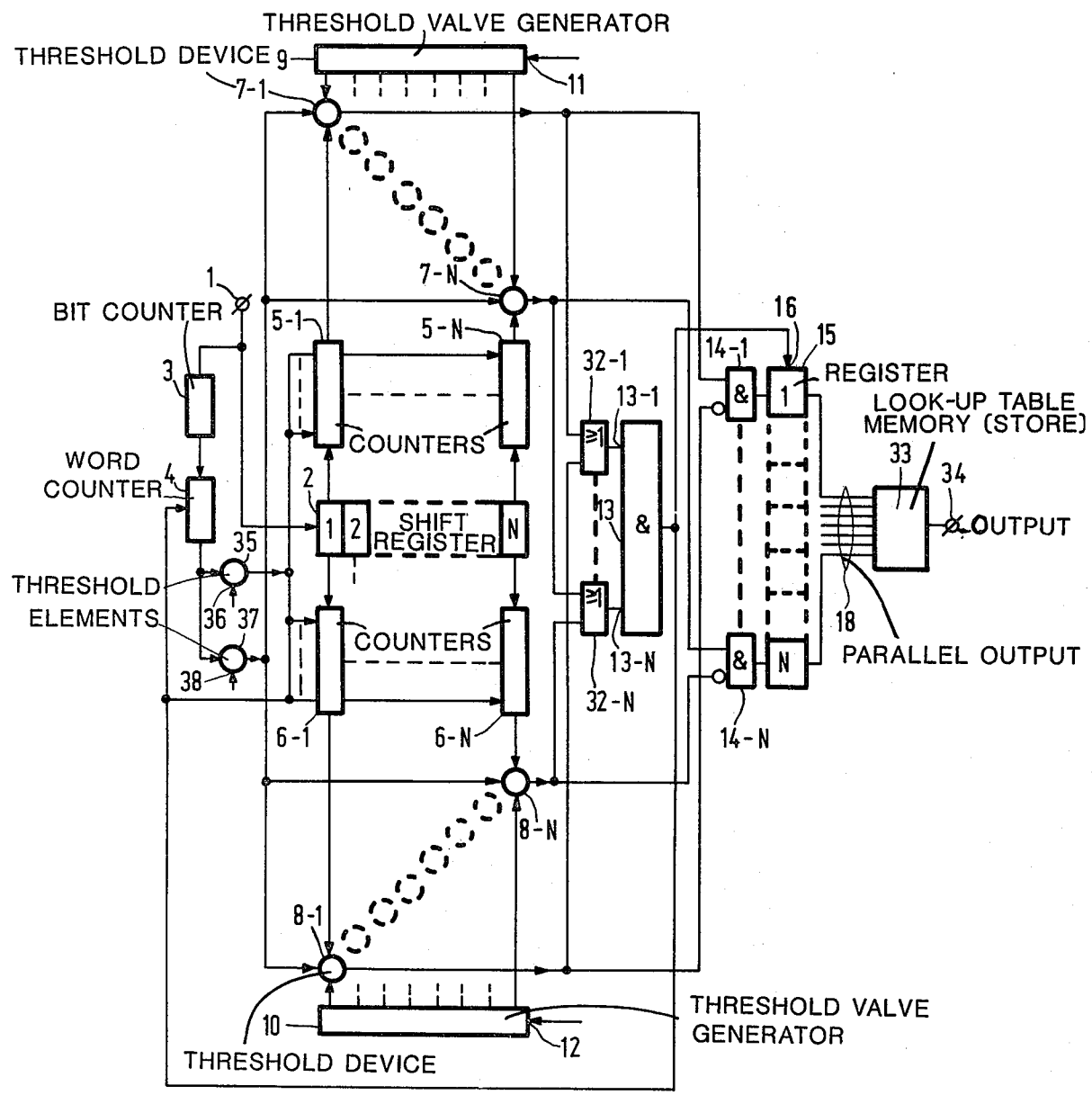
FIG. 3 shows a block schematic diagram of a first embodiment of a code detector for detecting code words of the type shown in FIG. 2, for carrying the method according to the invention into effect.

In communication systems, not only the information itself but also special characters or messages must be transmitted. These messages may occur prior to, subsequent to, or within the information. In telephone systems, for example, the exchange of information is preceded by the transmission of dial numbers, busy characters, check characters and other characters characterizing the transmission path and the switching state thereof. Register call-back signals are, for example, transmitted within the information. A digital bit stream such as may be found in a digital communication system is shown in FIG. 1. The information to be transmitted is designated by SP and the special characters or messages in the form of digitally coded words—the code words—are designated by CW. The code words CW are repeatedly transmitted in order to determine a correct code word on the basis of a majority decision in the case where a code word is mutilated as the result of a fault. In telephone systems operating in accordance with the compelled release procedure, a code word is transmitted until the receiver acknowledges the detection of the code word. The next code word or information is not transmitted until a consequential acknowledgement signal has been received. Generally, recognition of a code word will take longer according as the bit error rate is greater. This also appears from the requirements which are imposed on the maximum number of code word repetitions that are required to determine a correct code word with a certain probability.

TABLE I

| | Maximum number of code words | |
|---|---|---|
| | 0% BER | 10% BER |
| setting-up | 10 | 64 |
| traffic | 10 | 256 |

Table I shows an example of requirements which may be imposed in practice on a telephone system. In the setting-up phase, a code word must have been detected with certainty after a maximum of 10 repetitions of the code word for a bit error rate of 0% and with a probability of 99.99% after a maximum of 64 code word repetitions for a bit error rate of 10%. In the traffic phase, during the transmission of information, these numbers are 40 and 256 code words, respectively. A further requirement is that spurious code word bit patterns generated by means of randomly distributed noise cause a response of not more than once in $7.7 \times 10^{10}$ bits.

In some digital telephone systems delta modulation is used as the speech coding method. In such systems the single channel does not require (word) synchronization as regards the speech transmission. The situation is different for a code word. Since a good code word is repeatedly transmitted, an incorrect code word will be received when there is no synchronization between the receiver and the transmitter. In order to avoid the necessity of word synchronization for the code words, code words which can be derived from one another by cyclic permutation are given the same message as regards their meaning. In principle, $2^N$ messages can be coded with code words of N bits. The same message is given to code words which can be derived from other code words by cyclic permutation. Consequently, word synchronization for the code words is superfluous. With N=8, that is to say with $2^8=256$ code words, 36 different code words are obtained, which cannot be made identical to one another by cyclic permutation. The code word 11111111 is not so suitable, as a short-circuit in the transmission path may stimulate this word. The code word 00000000 may be generated by an open circuit in the transmission path. Further, the code words 10000000 and 01111111 (and any of their 7 cyclic permutations) are not utilized. This leaves 32 unique code words, a number which is amply sufficient to cover the need for signaling characters in telephone systems. Twenty-eight of these 32 code words occur in eight configurations, such as, for example, the code word shown in FIG. 2a. Three code words (11101110, 11001100 and 10001000) occur in four configurations and one code word (10101010) comprises only 2 cyclic permutations. When the code word shown in FIG. 2a is transmitted, the same code word as shown in FIG. 2a will be received when there is word synchronization. However, if there is no synchronization, the code word as shown in FIG. 2b will be received when the receiver is 7 bit positions "slow" with respect to the transmitter, the code word shown in FIG. 2c when the receiver is 6 bit positions "slow", and so on for the remaining FIGS. 2d-2h. As all these code words have been given the same message, synchronization is superfluous.

The method of detecting the code words will now be described with reference to FIGS. 3 to 6.

FIG. 3 shows a first embodiment of a code detector. A shift register 2 comprises N sections 2-1, 2-2, ... 2-N, each section having a "1" output and a "0" output. A binary digital bit stream is applied to the input of the shift register 2. The bit stream is divided into random data block of N bits. The number of bits of each data block is counted by a bit counter 3, for example a modulo-N counter, which is connected to an input 1. The number of data blocks is counted by a resettable word counter 4, connected to the output of the modulo-N counter 3. After an N-bit word has been entered into the shift register 2, it is determined in known manner for bit position i (i=1,2 ... N) whether the bit position contains a logic value of a first type, for example a "1", or a logic value of a second type, for example, a "0". A code detector comprises two groups of counters 5-1, 5-2 ... to 5-N and 6-1, 6-2 to 6-N. Each one of the counters 5-1 to 5-N and 6-1 to 6-N is connected to the associated section 2-1 to 2-N of the shift register 2. The counters 5-1 to 5-N are increased by one when a "1" is detected in the associated section of shift register 2, whereas the counters 6-1 to 6-N are increased by one when a "0" has been detected in the associated section. Thereafter, a next N-bit word is entered into the shift register 2, the word counter 4 is consequently increased by 1 and it is again determined which logic value has been stored in each section, and counters 5-1 to 5-N or counters 6-1 to 6-N are increased again in dependence thereon. An output of each of the counters 5-1 to 5-N is connected to an associated threshold device 7-1 to 7-N. Similarly, an output of each of the counters 6-1 to 6-N is connected to an associated threshold device 8-1 to 8-N. Further inputs of each of the threshold devices 7 and 8, respectively, are connected to a respective threshold value generator 9 or 10, and (in common) to an output of a threshold device 37. The threshold value which is applied by the respective threshold value generator 9 or 10 to the respective threshold devices 7-1 to 7-N and 8-1 to 8-N is set by means of a control signal applied to control the inputs 11 and 12, respectively, of the threshold value generators 9 and 10. If the counting values of one of the counters 5-1 to 5-N and 6-1 to 6-N exceeds the thresold value and the threshold device 37 supplies a logical "1" (enable signal), a signal is supplied, for example in the form of a logic "1", at the output 18 of the associated threshold devices 7-1 to 7-N and 8-1 to 8-N. The outputs of these threshold devices are connected, in pairs, to exclusive OR-circuits 32-1 to 32N, the outputs of threshold devices 7-1 and 8-1 being connected to inputs of exclusive OR-gate 32-1, the outputs of threshold devices 7-2 and 8-2 to inputs of exclusive OR-gate circuit 32-2 and so on. Each one of the outputs of the exclusive OR-gate circuits 32-1 to 32-N is connected to an associated N input of an AND-gate circuit 13, the output of exclusive OR-gate circuit 32-1 being connected to input 13-1 the output of exclusive OR-gate circuit 32-2 to input 13-2, and so on. If N or 2N counters 5-1 to 5-N and 6-1 to 6-N exceed the threshold value, namely one of each pair 5-1/6-1, 5-2/6-2 . . . 5-N/6-N, the output of the AND-gate 13 changes state. The outputs of the threshold devices 7-1 to 7-N and 8-1 to 8-N are further connected in pairs to AND-gates 14-1 to 14-N. Each of the AND-gates 14-1 to 14-N has an inverting and a non-inverting input. The threshold devices 7-1 to 7-N are connected to the non-inverting inputs and the threshold devices 8-1 to 8-N are connected to the inverting inputs. Outputs of the AND-gates 14-1 to 14-N are connected to an associated section of a register 15. If the threshold value of threshold device 7-1 is exceeded and, consequently, the threshold value of threshold device 8-1 is not exceeded, the output of the AND-gate 14-1, which is connected to the output of these threshold devices, will change state. If, on the contrary, the threshold value of threshold device 8-1 is exceeded (and consequently, the theshold value of threshold device 7-1 is not exceeded) the output of this AND-gate 14-1 does not change state. The output signals of the AND-gates 14-1 to 14-N are stored in the register 15 at an instant, determined by the instant at which AND-gate 13 changes state. To this end the output of AND-gate 13 is connected to a control input 16 of the register 15. The register 15 now contains the bit value of the code word. Outputs of register 15 are connected to a store (a look-up table memory) 33 for addressing a storage location corresponding to the code word and containing one of the messages. In the example given hereinbefore, namely N=8, the store 33 contains a total of 256 addresses, at each different 8 of which the same message can be found so that one output of 32 messages can be found altogether. After detection of a code word the associated message is available at an output 34 of store 33. The word counter 4 is reset after detection of the code word. To this end the output of AND-gate 13 is also connected to a resetting input of the word counter 4. The output of AND-gate 13 is also connected to resetting inputs of the counters 5-1 to 5-N and 6-1 to 6-N for resetting these counters on detection of the code word. In addition, the output of the word counter 4 is connected to a threshold element 35 to apply, when a threshold value which was applied to input 36 is exceeded, a resetting pulse to the resetting inputs of the counters 5-1 to 5-N and 6-1 to 6-N, which resetting inputs are connected to the output of the threshold element 35. The output of word counter 4 is connected to a threshold device 37 for supplying a logical "1", enable signal to the threshold devices 7-1 to 7N when a threshold value applied to input 8 is exceeded and 8-1 to 8-N.

The code detector shown in FIG. 3 operates as follows in a telephone system. In the setting-up/signaling phase, the thresold value generated by the threshold value generators 9 and 10 is adjusted to 5, when the requirements shown in Table I are used. The threshold value of the threshold element 35 is adjusted to 32. The bit stream applied to the input 1 is applied to the register 2 in groups of N bits. Let is be assumed that N=8 and that the code word is the code word shown in FIG. 2a. After the occurrence of the five consecutive words in the register 2, and the numbers of "1" and "0" have been recorded in the associated counters, the counters 5-1, 6-2, 6-3, 6-4, 5-5, 6-6, 6-7 and 5-8, for example, will have attained a counter position which is equal to the threshold value 5, provided no bit errors have occurred. All 8 inputs of AND-gate 13 will then change state and the code word is determined in register 15 by means of the AND-gates 14. The input, connected to threshold device 7-1, of AND-gate 14-1 will be high and the inverting input, connected to the threshold device 8-1, of AND-gate 14-1 will be low. A logic value 1, which will be entered in the register section 15-1, will consequently be available at the output of AND-gate 14-1, Similarly, AND-gate 14-2 will have a zero available at its output, which will be entered into the register section 15-2. Other logic values are entered similarly in the remaining register sections 15-3 to 15-N. The code word has now been decoded and the word counter 4 and the counters 5-1 to 5-N and 6-1 to 6-N are reset.

The threshold value has been chosen so that it is half the maximum permissible number of 10, to ensure that the code words will be detected within 10 code words. If, namely, the first 8-bit word entered into shift register 2 consists partly of the preceding code word and partly of the new code word still to be detected, then, if the threshold value is 10, it would not be possible to detect the code word within the required number of 10 code word repetitions, but only after 20 code word repetitions. If, on the contrary, the threshold value is 5 and the code word has not been detected after five repetitions of the code word, for example for the above reasons, then the code word will be recognized with certainty in the next cycle of 5 code words and has then been detected after 9 code words.

When the bit error rate in the incoming bit stream is unequal to zero, the code word will be mutilated owing to bit errors, so that more code words will be required to determine which code word was transmitted. In view of the requirement laid down in Table I, 32 consecutive code words are examined to determine which code word occurs five times. If the code word is detected, the word counter 4 and the counters 5-1 to 5-n and 6-1 to 6-N are reset by means of a signal supplied by AND-gate 13. If, on the contrary, the code word has not been detected after 32 words, the word counter 4 exceeds the threshold value of threshold element 35 and the counters 5-1 to 5-N and 6-1 to 6-N are reset.

In the traffic phase, in accordance with the specification of Table I, the threshold values generated by threshold value generators 9 and 10 are adjusted to 2 and the threshold element 35 is adjusted to 128. In the traffic phase the code detector operates in exactly the same manner as in the setting up/signaling phase.

The flow chart shown in FIG. 4 illustrates a first embodiment of the method of detecting code words.

The following explanatory texts belong to the legends in the geometric Figures which explain the functions and the states of the method of time-sequential detection of code words. It should be noted that such a time sequence of functions and associated states of the method of detecting code words can be realized in universal sequentially programmable logic circuits such as commercially available microprocessors with associated stores and peripheral equipment (for example type CDP 1804 of RCA).

| legend | description |
|---|---|
| -1- STRT | Start |
| -2- $T_1 = T_2 = \ldots T_{2N} = K := 0$ | Registers $T_1, T_2, \ldots T_N$ are given a value zero. The bits into which the bit stream is divided is counted in a register K which is given the value zero |
| -3- CW | A N-bit word is written in. |
| -4- K:=K+1 | Register K is increased one unit |
| -5-$T_i = T_i + 1(b_i=1)$ $T_{i+N} \colon T_{i+N} + 1(b_i=0)$ | The content $b_i$ of CW is examined for each bit position $i(i=1, \ldots N)$ If $b_i$ has a value 1, register $T_i$ is increased one unit; if, on the contrary, $b_i$ has a value 0, register $T_{i+N}$ is increased one unit. |
| -7- $T_{Ti}/T_{i+N} \geqq n$? | The registers $T_1, t_2, \ldots T_{2n}$ are compared with a value n. If of each pair $T_i/T_{i+N}(i=1,2, \ldots N)$ one register reaches or exceeds the value n, then step -8- is preformed. If the value n is not reached or not exceeded, step -2- is performed. |
| -6- K = m? | The number of words K is compared with a predetermined value m. If K is equal to m, operation is continued with step -7-. If K is not equal to m, step -3- is performed. |
| -8- CWN | The code word is formed from the N registers in which the value n was exceeded, registers $T_i$ representing a value 1 and registers $T_{i+N}$ representing a value 0. |
| -9- STP | stop. |

Figure 5:
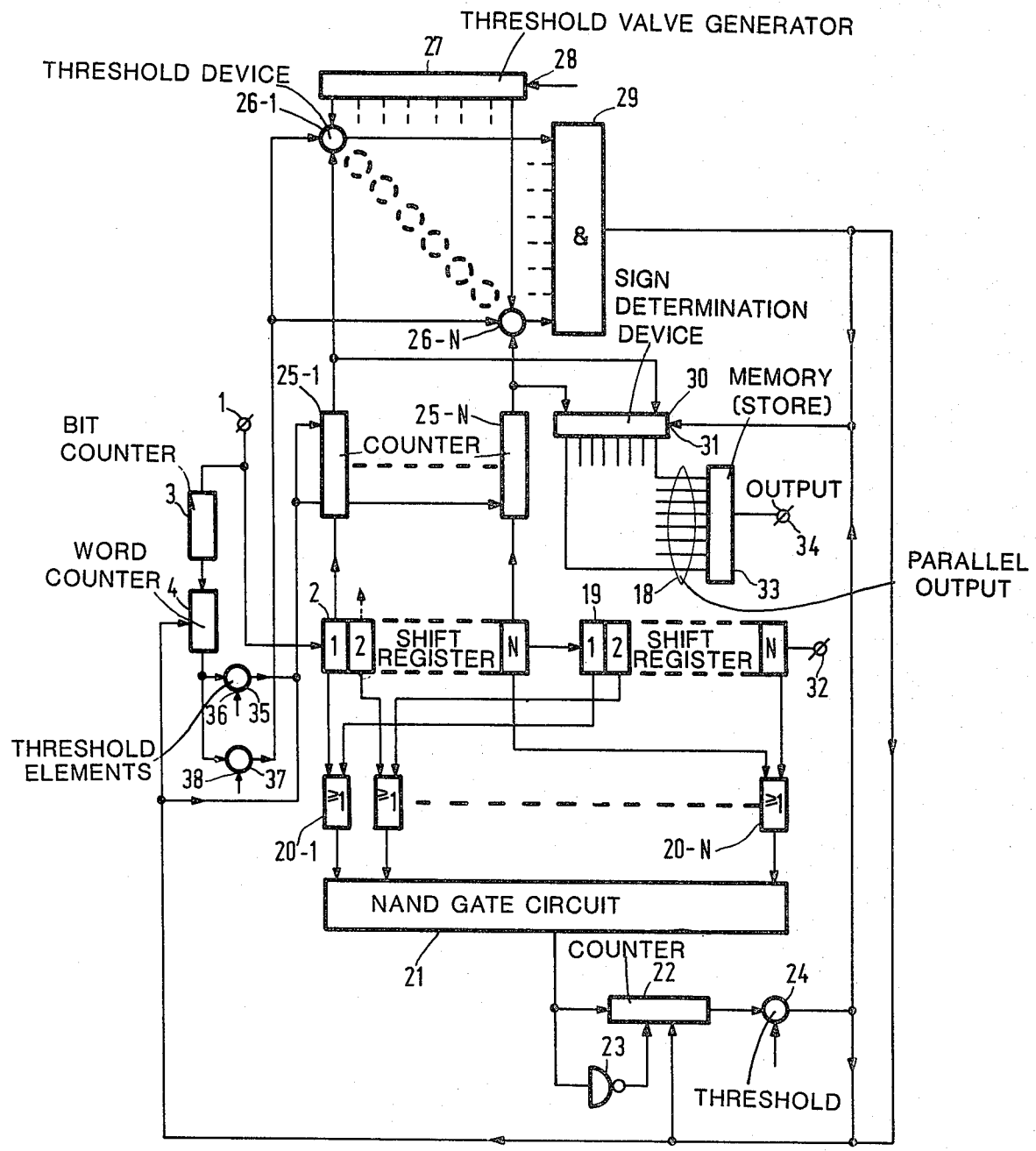
FIG. 5 shows a block schematic diagram of a second embodiment of a code detector for detecting code words of the type shown in FIG. 2 for carrying the method according to the invention into effect.

FIG. 5 shows a block schematic diagram of a second embodiment of the code detector for the detection of code words. Input terminal 1, which receives a binary digital bit stream is connected to the input of a shift register 2 having N sections. The bits are counted by a counter 3, for example a modulo-N counter, connected to the input terminal 1. A resettable word counter 4 for recording the number of times a group of N bits has been entered into shift register 2 is connected to an output of the counter 3. A second shift register 19 is connected to an output of shift register 2. Shift register 19, and also shift register 2, comprises N sections. Those sections of the shift registers 2 and 19 of the same numerical order, that is to say sections 2-1 and 19-1, 2-2 and 19-2... to 2-N and 19-N, are connected to exclusive OR-circuits 20-1, 20-2 to 20-N. When the bit values i corresponding positions in the shift registers 2 and 19 are identical, the outputs of the exclusive OR-circuits change state. The outputs are connected to the same number of inputs of a NAND-circuit 21. The output of NAND-circuit 21 is connected to an input of a resettable counter 22 and, by way of an inverting gate circuit 23, to a reset input of the counter 22. Each time the exclusive OR-circuits detect bit agreement, counter 22 is increased one unit. If there is no bit agreement, the counter 22 is reset by way of the inverting gate circuit 23. The output of counter 22 is connected to a first input of a threshold element 24. A second input receives a threshold value.

A further output of each secttion of shift register 2 is connected to a corresponding counter 25-1 to 25-N. The counters 25-1 to 25-N are up/down counters. When a "1" occurs in the bit section to which the counter is connected the counting value is increased one unit and when "0" occurs the counting value is decreased one unit. Connected to the output of each of the counters 25-1 to 25-N is an associated threshold device 26-1 to 26-N whose output changes state when a threshold value, generated by a threshold value generator 27 and applied to a further output of these threshold devices, is exceeded. The output of each threshold device 26-1 to 26-N is connected to one of N inputs of an AND-circuit 29. The threshold devices 26-1 to 26-N have been designed so that only the absolute value of the content of each of the counters 25-1 to 25-N is compared with the threshold value.

The outputs of the counters 25-1 to 25-N are further connected to a sign determination device 30. The output of AND-circuit 29 is connected to a control input 31 of sign determination device 30. When the output of AND-circuit 29 changes state, the sign determination device 30 determines the sign of the counting value of each of the counters 25-1 to 25-N. The code word is then available at the output 18 of the device 30. For the same purpose the output of threshold element 24 is also connected to input 31 of sign determination device 30. The outputs of AND-gate circuit 29 and threshold element 24 are further connected to a resetting input of counter 22, to a resetting input of word counter 4 and to resetting inputs of counters 25-1 to 25-N for resetting counter 22, word counter 4 and the up/down counters 25-1 to 25-N, after the code word has been detected. An output of word counter 4 is connected to threshold element 35 for applying reset signals to the resetting inputs of the counters 25-1 to 25-N when a value which is applied to a further input 36 of threshold element 35 is exceeded.

The code detector shown in FIG. 5 in, for example, a telephone system having the specification indicated in Table I, operates as follows. A threshold value 9 (setting-up phase) or a threshold value 39 (traffice phase) is applied to threshold element 24; a threshold element 32 is applied in the setting-up phase to threshold element 35: a threshold value 128 is applied in the traffic phase to threshold element 25. Threshold value generator 27 generates a threshold value in the setting-up phase and a threshold value 64 in the traffice phase. The bit stream applied to input terminal 1 is divided into groups of 8 bits. The number of groups is counted in counter 4. A group of eight bits is entered into the shift register 2. It is determined for each section whether a "1" or a "0" is present. If a "1" is present, the associated bit counter 25-1 to 25-N is increased by one unit; if a "0" is present, the associated bit counter is reduced by one bit. Thereafter, a next group of 8 bits is entered into shift register 2, and so on. When the absolute value of all counters 25-1 to 25-N exceeds the threshold value (6 in the setting-up phase and 64 in the traffic phase) the AND-gate circuit 29 connected to the threshold devices 26 activates the sign determination device 30 by means of a signal applied to input 31. Device 30 converts the sign of the counting values of the relevant counter into a logic value. The logic values on the parallel output 18 form the code word to be detected. If the code word has not been detected after 32 (setting-up phase) or 128 (traffic phase) groups of 8 bits, the counters 25-1 to 25-N are reset and a new cycle is started. In order to detect, for a bit error rate of 0%, the code word within the maximum number of code words, the second shift register 19 is connected to the output of shift register 2. After a group of 8 bits has been examined in register 2, this group is entered in the second shift register 19 and a new group of 8 bits is entered into the shift register 2. It is checked whether there is bit agreement in each corresponding section. If this is the case for each position, the outputs of the excluded OR-gate circuit 20 change state, causing NAND-gate circuit 21 to change the state and to supply a pulse to counter 22. The counting value of counter 22 will reach the threshold value after 9 code words in the case of 0% BER, which is an indication that the code word has been detected. The code word is, for example, read by activating sign determination device 30 or by using an output 32 of shift register 19. After the threshold value of threshold element 24 has been reached, counters 25-1 to 25-N and the counters 22 and 4 are reset.

Figure 6:
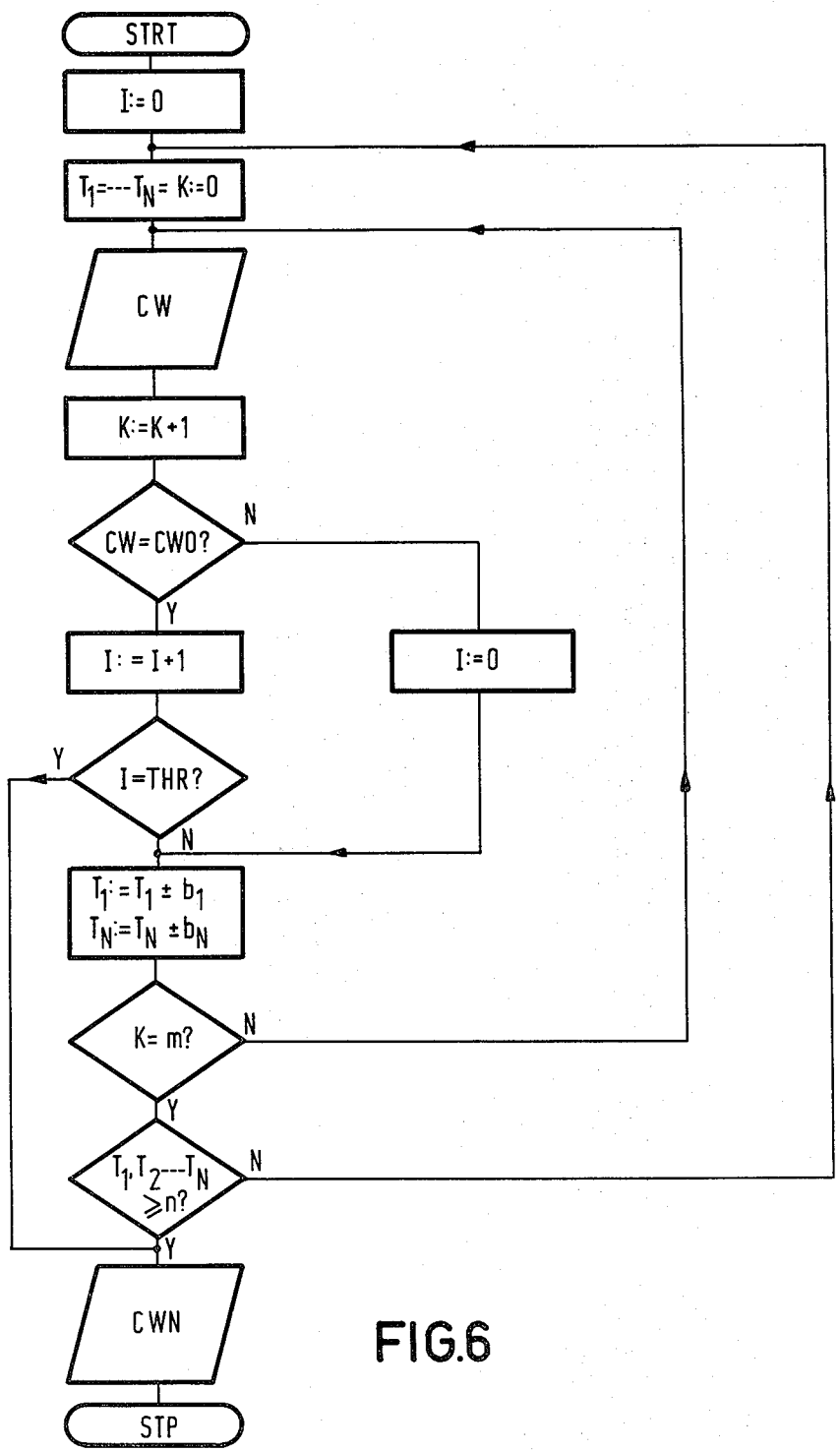
FIG. 6 is a flow chart of a second embodiment of the method according to the invention.

A second embodiment of the method of detecting code word is illustrated by the flow chart of FIG. 6. The following explanatory texts are associated with the legends in the geometric Figures which explain the functions and the conditions of the method of detecting code words in time sequence.

| legend | description |
|---|---|
| -1- STRT | Start |
| -2- I:=0 | Register I is given a value zero. Register I is used to record how many times two consecutive code words are identical. |
| -3- $T_1=:T_N=K:0$ | Registers $T_1, T_2, \ldots T_N$ are given a value zero. The words into which the bit stream is divided are counted in a register K, which is given a value zero as the initial value; |
| -4- CW | An N-bit word is written in. |
| -5- K:=K+1 | Register K is increased by one unit. |
| -6- CW=CW0 ? | The word CW is compared bit-by-bit with the preceding code word CW0. If there is bit agreement, the next step is performed. If there is no bit agreement step -9- is performed as the next step. |
| -7- I:=I+1 | Register I is increased by one unit; |
| -8- I=THR ? | The content of register I is compared with a threshold value THR. If I has not reached this value step -10- is performed as the next step. If I has reached this value then step -13- is peformed as the next step. |
| -9- I:=0 | Register I is given the value zero; |
| -10- $T_1:=T_1\pm b_1$ $T_N:=T_N\pm b_N$ | The register values $T_1, T_2, \ldots T_N$ are increased by one unit or reduced by one unit, depending on whether the associated bit position $b_1, b_2 \ldots b_N$ has a first or a second binary value; |
| -12- $T_1, T_2, \ldots T_N \geq n$ ? | The content of the registers $T_1 \ldots T_N$ is compared with a threshold value n. When all the registers have a value which is at least equal to n, then step -13- is performed as the next step. If this is not the case step -3- is performed. |
| -11- K=m ? | If register K has reached a predetermined value m, step -12- is performed as the next step. If this is not the case, proceed to step -4-. |
| -13- CWN | The code word thus determined is read; |
| -14- STP | Stop. |

The embodiment of the method of FIG. 6 has the advantage, compared with the embodiment of the method of FIG. 4, that in the former only 8(+2) counters must be re-adjusted, whereas in the latter 16(+2) counters. With the method of FIG. 6 two data blocks of N bits must be compared, which is not necessary in the method of FIG. 4, but this is only a minor extension, as this comparison may be carried out by checking whether the difference in the code words of data blocks is 0.

What is claimed is:

1. A method of detecting a message in the form of a digital code word, the digital code word containing a sequence of a predetermined number of bits and being included a few times consecutively and sequentially in a bit stream, characterized in that the bit stream is randomly divided into data blocks, each data block having a number of bits which is equal to the number of bits of the digital code word;

the digital bit state is determined and recorded for each bit position in the data block;

the recorded data of each bit position are accumulated for a plurality of consecutive data blocks;

the accumulated value of the recorded data of each bit position for a plurality of data blocks is compared with a threshold value;

the digital code word is detected from the digital state of the accumulated values when the threshold value for each bit position in a plurality of data blocks has at least been reached.

2. A method of detecting a digital code word as claimed in claim 1, characterized in that the digital code word and the bit stream contain binary data.

3. A method of detecting a digital code word as claimed in claim 2, characterized in that the number of times a first digital state of each bit of the data block is determined is accumulated by a first accumulator and that the number of times a second digital state of each bit of the data block is determined is accumulated by a second accumulator.

4. A method of detecting a digital code word as claimed in claim 2, characterized in that a first digital state of each bit of the data block is accumulated with a positive sign and that a second digital state of each bit of the data block is accumulated with a negative sign.

5. A method of detecting a digital code word as claimed in claim 4, characterized in that:

a data block is compared with a preceding data block;

the number of times data blocks are consecutively and sequentially identical is accumulated; and when a threshold value is reached by the accumulated value, the digital code word is identical to the data block.

6. A code detector for detecting a message in the form of a digital code word, the digital code word containing a sequence of a predetermined number of bits and being included at least two times consecutively and sequentially in a bit stream comprising: a shift register having a number of sections equal to the number of bits (N) of the digital code word, each section having an output, means for randomly dividing the bit stream into data blocks of N bits, these data blocks being applied to an input of the shift register, the output of each section being coupled to associated counting means for determining the number of times that the same digital state of the bit has occurred in each section in a plurality of data blocks, and the code detector further comprising threshold devices each having a first input for receiving a threshold value and a second input connected to the asociated counting means, and an output, the outputs of the threshold devices providing signal values, which are a representation of the digital code word, when the threshold value of each threshold device is exceeded.

7. A code detector as claimed in claim 6 characterized in that the counting means comprise a first and a second group of N counters, one counter of each group being coupled to one of the sections of the shift register, the first group of counters accumulating the number of times the first digital state of the bits of the data block in a preceding number of data blocks has been determined, and the second group of counters accumulating the number of times the other digital state of the bits of the data block in the preceding number of data blocks has been determined.

8. A code detector as claimed in claim 6 characterized in that the counting means comprise a group of N counters, each section of the shift register being coupled to the associated counter, the count of the counters being increased by one unit when the first digital state of the data block has been determined and reduced by one unit when the second digital state of the data block has been determined.

9. A code detector as claimed in claim 8, characterized in that the code detector comprises a further shift register having N sections each having an output, that the corresponding outputs of the two shift registers are connected to exclusive OR-gate circuits to determine bit agreement in the corresponding sections, that outputs of the N exclusive OR-gate circuits are connected to inputs of a NAND-gate circuit, and that an output of the NAND-gate circuit is connected to a counting element for accumulating the number of times consecutively sequential data blocks are identical.

* * * * *